Jan. 19, 1932.  E. S. C. DEVILLE  1,842,255
CINEMATOGRAPHIC PROJECTION SYSTEM WITH CONTINUOUS TRAVEL OF THE FILM
Filed Feb. 26, 1927  8 Sheets-Sheet 1

Fig. 1

Inventor:-
Etienne Sainte Claire Deville
By Mauro, Cameron, Lewis & Kirkham
Attorneys Jan. 19, 1932. E. S. C. DEVILLE 1,842,255
CINEMATOGRAPHIC PROJECTION SYSTEM WITH CONTINUOUS TRAVEL OF THE FILM
Filed Feb. 26, 1927 8 Sheets-Sheet 3

Fig. 6 — Upper image
Fig. 8 — Upper image
Fig. 5 — Lower image
Fig. 7 — Lower image Inventor
Etienne Sainte Claire Deville
By Mauro, Cameron, Lewis & Kirkham
Attorneys Jan. 19, 1932.  E. S. C. DEVILLE  1,842,255
CINEMATOGRAPHIC PROJECTION SYSTEM WITH CONTINUOUS TRAVEL OF THE FILM
Filed Feb. 26, 1927   8 Sheets-Sheet 5

Inventor:-
Etienne Sainte Claire Deville
By Mauro, Cameron, Lewis & Kerkan
Attorneys

Jan. 19, 1932.  E. S. C. DEVILLE  1,842,255
CINEMATOGRAPHIC PROJECTION SYSTEM WITH CONTINUOUS TRAVEL OF THE FILM
Filed Feb. 26, 1927  8 Sheets-Sheet 6

Fig. 11.

Inventor,
Etienne Sainte Claire Deville
By Mauro, Cameron, Lewis & Kirkham
Attorneys Jan. 19, 1932.  E. S. C. DEVILLE  1,842,255
CINEMATOGRAPHIC PROJECTION SYSTEM WITH CONTINUOUS TRAVEL OF THE FILM
Filed Feb. 26, 1927  8 Sheets-Sheet 7

Inventor
Etienne Sainte Claire Deville
By Mauro, Cameron, Lewis & Massan
Attorneys Patented Jan. 19, 1932

1,842,255

UNITED STATES PATENT OFFICE

ETIENNE SAINTE CLAIRE DEVILLE, OF PARIS, FRANCE, ASSIGNOR TO SOCIETE DES ETABLISSEMENTS GAUMONT, OF PARIS, FRANCE, A CORPORATION OF FRANCE

CINEMATOGRAPHIC PROJECTION SYSTEM WITH CONTINUOUS TRAVEL OF THE FILM

Application filed February 26, 1927, Serial No. 171,236, and in France March 4, 1926.

Attempts have been made during the past period to improve the cinematographic projection apparatus for the obtainment of the continuous travel of the film as well as to dispense with the periodical stopping of the light and hence to obviate the effects of flickering. The advantages to be thus obtained have been frequently stated, and will hence need no further mention.

As concerns the methods proposed, certain of these are of a most ingenious nature, but the methods which are best adapted to solve the problem comprise the use of a plurality of compensating mirrors which are successively displaced in the path of the projection beam.

In order that the image projected on the screen shall be sufficiently fixed, it is necessary that the inclination of the several mirrors shall be regulated in a most accurate manner, since the projection upon the screen is the combination of a series of images projected by the same lens consisting of beams reflected by the different mirrors. If therefore one or more of the said mirrors should become slightly displaced, the defect can only be obviated by making an individual adjustment. But since the apparatus must be taken apart for this purpose, it is impossible to verify the effect of the adjustment by direct observation during such operations.

It has been shown by experience that such difficulties in the adjustment constitute the principal cause of the defective operation of apparatus providing for the continuous travel of the film.

The present invention has for its main object to provide for the adjustment after the apparatus has been erected, and by operations of a simple character effected upon the apparatus when functioning, by the use of external parts which are readily accessible.

For this purpose I employ two objectives, each of which is provided with a separate oscillating mirror (or prism) which may be mounted upon its support without any accurate adjustment, since the compensating mirrors (or prisms) are not movable in the path of the beam of light, and in fact the beam itself is deflected alternately towards the first and the second objective by means of two respective distributing mirrors (or prisms) which are specially arranged for the purpose and are given only a rectilinear motion.

The defects in the initial setting of the oscillating mirrors and the defects in the distributing mirrors may thus be readily corrected while the apparatus is in full operation, by means of an external device which acts upon the beam issuing from one of the objectives.

The optical and mechanical parts of the projection system may be manufactured in standard types and may be mounted without any repeated trials or experiments.

The following description with reference to the appended drawings which is given by way of example shows the manner in which the said invention may be carried into effect.

Fig. 2 is an elevational view of the apparatus, looking from the left-hand side of Fig. 1. In that figure, the device for guiding and drawing the film, including rollers 28, guiding part 2, and other elements of well known structures, have been removed for the sake of clearness. These elements, which are known per se, and are not part of the invention, would, if shown in Fig. 2, prevent important elements, such as 6, 3, 4 and 5, from being clearly seen.

The film which is drawn forward by the toothed drum 1 (Fig. 1) travels with a continuous and uniform motion in the guiding element or gate 2 and passes before an aperture which is lighted by the beam from the propector.

At 3 and 4 (Figs. 1 and 2) is disposed a pair of crossed prisms. The prism 3 reflects the beam upwardly and the prism 4 reflects it downwardly. The pair of prisms is given a reciprocating motion perpendicularly to the plane of Fig. 1. This motion is obtained by the transformation of a circular motion, and the inversions of the motion take place without shocks.

For the sake of convenience in the description, I will employ the word "period" to designate the time required for the travel of a given image before a fixed line and this period will be divided into six equal parts.

The reciprocating motion of the set of crossed prisms is combined in the following manner:

During the first sixth of a period, the prism 4 receives the whole of the projected beam and reflects it downwardly.

During the second sixth of a period, the line of separation of the two prisms traverses the projected beam, so that a certain part of the beam is reflected downwardly and the other is reflected upwardly.

During the third and fourth sixths of a period, the prism 3 receives the whole of the beam and reflects it upwardly.

During the fifth sixth of a period, the line of separation traverses the beam in the contrary direction, and the beam will be again divided between the two directions.

During the last sixth of a period, the prism 4 receives the whole of the beam and reflects it downwardly.

Figure 4:
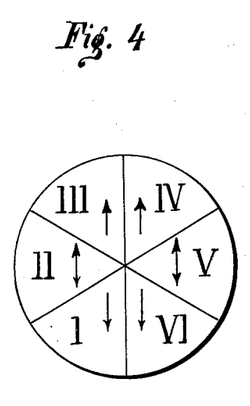

To recapitulate, if I employ the numbers I, II, III, IV, V, VI for the intervals of time which correspond to a sixth of a period and which succeed one another by rotary permutation, the direction of the beams will be as shown in the diagram Fig. 4 by the direction of the arrows.

At 5 and 6 (Figs. 1 and 2) are disposed two movable prisms designated as compensating prisms which reflect the beams respectively upon the two lenses 7 and 8; said prisms are given an oscillating motion on the axes O and O', and this motion has a certain relation to the travel of the film.

Figure 3:
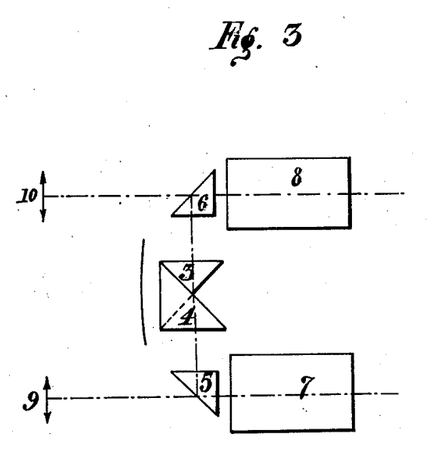
Figs. 3 to 8 are diagrams relative to the functioning.

During two-thirds of a period, each of the prisms 5 and 6 rotates in such manner that the virtual image of one of the film pictures will remain stationary in the positions 9 and 10 (Fig. 3) and for one-third of a period the rotation takes place in the opposite direction, so that at the end of this rotation the image of the set $n'$ is replaced by the image of the set $n+1$ which comes exactly into the same place.

However, due to the arrangement of the mechanism which regulates the motion of the prisms, this inverse rotation, which so to speak takes up the image $n+1$ and brings it into the place which was occupied by the image of the set $n$, is effected during the intervals of total darkness i. e. the intervals III and IV for the prism 5 and the intervals I and VI for the prism 6.

During the intervals II and V of combined lighting, the line of separation of the crossed prisms traverses the beam in the first time in one direction and the second time in the other direction.

By observing the lower virtual image 9 (Fig. 3) corresponding to the compensating prism 5, it is found that during the time I, the image will be completely lighted, as shown in the diagram Fig. 4, and that during the time II the virtual image of the line of separation traverses the field of the image 9 in a direction which depends upon the construction of the apparatus and which may be arbitrarily selected.

Figure 5:
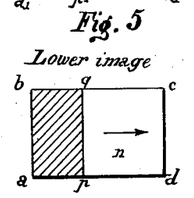

At a given instant, this line of separation will have the position $p\ q$ (Fig. 5) and will separate the dark entering portion $a\ b\ p\ q$ from the lighted out going portion $p\ q\ c\ d$ of the image of the set $n$.

Figure 6:
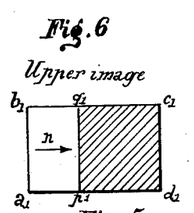

If one observes at the same time the upper virtual image 10 (Fig. 6), the line of separation will occupy in the rectangle $a^1\ b^1\ c^1\ d^1$, the same position $p^1\ q^1$, but the dark and lighted parts will be inverted; at $a^1\ b^1\ q^1\ p^1$ is located the lighted entering portion and at $p^1\ q^1\ c^1\ d^1$ the dark outgoing portion.

Figure 7:
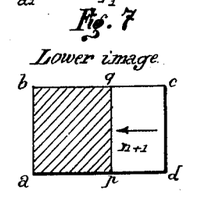
Figure 8:
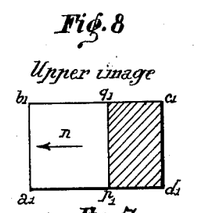

During the interval V, the position of the lighted and dark parts is shown in Fig. 7 for the lower image and in Fig. 8 for the upper image. But during the intervals III and IV, the lower image becomes dark and the image $n$ is replaced by the image $n+1$, so that this latter image will enter at the side $c\ d$. For this reason, during the time of combined lighting of set II, the upper and lower virtual images are complementary and consist of the film pictures of the set $n$, and during the times of the set V the two images are also complementary, but whilst the upper out going image is of the set $n$, the lower entering image is of the set $n+1$.

These two images, which differ but little, will match upon the line of separation during the transverse travel of this line, for which travel the time is in the order of 1/100 second.

II.—Lenses

In line with each of the upper and lower virtual images is an optical system consisting of an ordinary objective lens for projection purposes to which is added a diverging lens of long focus which is placed at a certain distance (30 to 40 mm.) from the front lens of the objective.

It is feasible to constitute different series for this optical system by varying the focal lengths of the objective and the divergent lens. Such combinations are to be chosen according to the distance between the screen and the apparatus and according to the angle of the projection which is to be employed. The said ordinary objective is placed at such distance from the virtual image that it produces a real image conjugated upon a position adjacent the external focus of the diverging lens.

One of the functions of the said lens is to carry this real image to the screen, but its principal function is to allow of readily obtaining, by slight vertical or lateral displacements, the exact coincidence of the two images projected by the two objectives.

The mechanical arrangement employed for the purpose will be further described.

III.—Mechanical construction

The principal elements of the apparatus are as follows:

a.—A device assuring the movement of the compensating prisms.
  b.—A device for the reciprocating motion of the crossed prisms.
  c.—A device for the travel of the film.
  d.—A device for framing the projected image.
  e.—Regulating means.

(a).—*Oscillating motion of the compensating prisms*

A cam C (Fig. 9) is keyed to a shaft which carries the driving pulley of the apparatus and rotates at the rate of one revolution per period; said cam actuates through the medium of the rollers G and $G^1$—two levers AB and $A^1B^1$ which are rotatable on the axles A and $A^1$, respectively. At O and $O^1$ are the axles of rotation of the compensating prisms; on each axle is mounted an arm, O D for the prisms 6 and $O^1$ $d^1$ for the prism 5. The arm O D is mounted on the axle O and the arm $O^1D^1$ on the axle $O^1$. The ends D and $D^1$ are pivoted to the respective rods D F and $D^1$ $F^1$ which are in turn pivoted at F and $F^1$ to the levers A B and $A^1$ $B^1$; suitably disposed springs assure the contact between the said rollers and the cam and provide for taking up the wear at the joints. It is observed that the rotation of the prism depends upon the outline of the cam, which is so shaped that the conditions specified in section II will be obtained.

Figure 9:
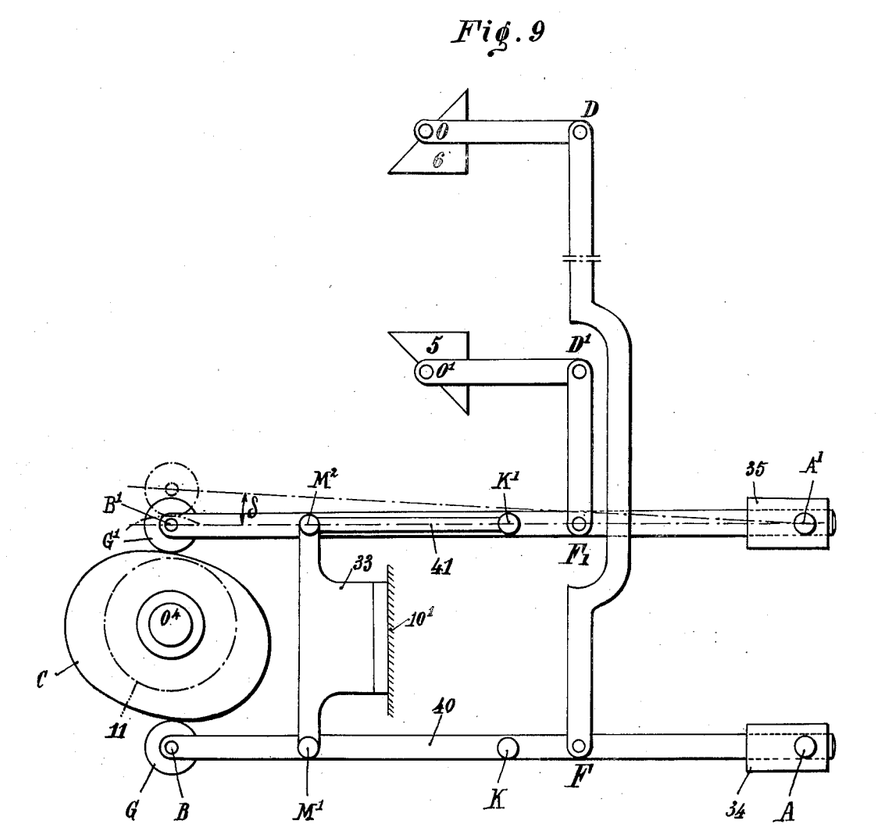
Fig. 9 is a detail view of the control for the compensating prisms.

Referring to Fig. 9, it is noted that if special measures were not taken, the centres of the rollers would describe arcs about the points A and $A^1$; these circles are symmetrical with reference to a horizontal line passing through the axis of the cam, but not with reference to this axis itself. Due to this lack of symmetry, it will result that the two levers controlled by the said rollers rotating on the same cam will not successively possess movements of rotation which are exactly symmetrical.

This defect can be obviated with facility by a very simple device which obliges the centres of gravity to move upon a vertical line, while the levers continue to oscillate on the same axles A and $A^1$. For this purpose the two levers may be disposed in the following manner. They are not pivoted directly to the two stationary axles A and $A^1$, but their ends opposite the rollers are slidable in two respective boxes 34 and 35 (Fig. 1) which are pivotally mounted in two respective forks 38—39 secured to the member 36. I will specify in section e (2) relative to the film corrector, the functions of this member 36 which is for the moment supposed to be stationary with reference to the main frame of the apparatus.

Figure 1:
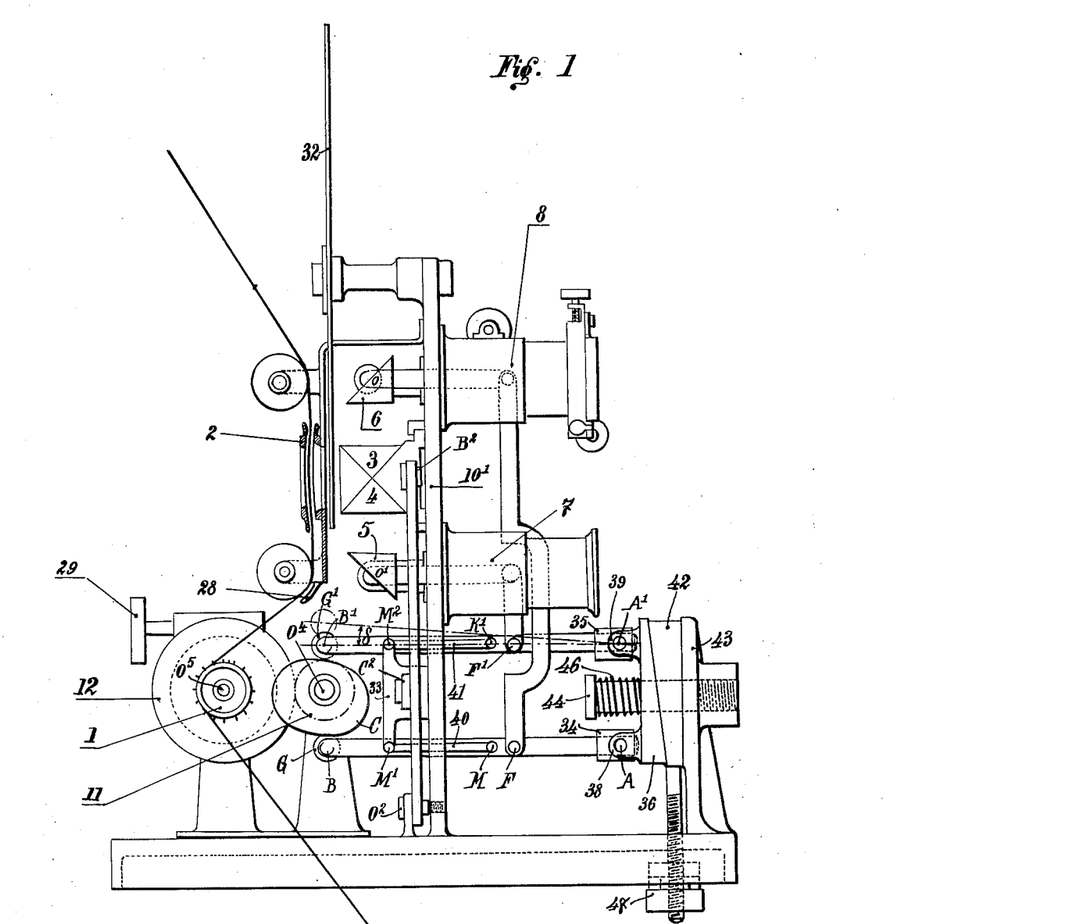
Fig. 1 is a side view of the apparatus.

The two links 40—41 are pivoted at $M^1$—$M^2$ respectively, to a member 33 secured to the main frame $10^1$, and at K—$K^1$ to the respective levers A B $A^1$ $B^1$. When the rollers rise and descend upon the outline of the cam, the levers will be inclined in the two directions while sliding in the boxes 34—35, and their pivoting points at K and $K^1$ will describe arcs about the respective pivots $M^1$—$M^2$.

It may be shown by a simple calculation that if the dimensions of each of the two systems of levers and links comply with the condition:

$$\overline{M_1K} = \frac{\overline{BK}}{\overline{KA}}$$

and if the maximum angle $\delta$ of the inclination of the lever with reference to the horizontal position (which angle is expressed in radians) is so small that its cube may be neglected, the centres B and $B^1$ of the rollers G—$G^1$ will practically describe vertical straight lines. In the case under consideration, $\delta = 0.0633$ and $\delta^3 = 0.00024$; so that the distance between the extreme positions of the centres B or $B^1$ and the vertical line is quite negligible.

(b).—*Reciprocating motion of the crossed prisms (Fig. 10)*

The prisms 3 and 4 are mounted in a metallic frame which is slidable in grooves formed in the upright $10^1$ (Fig. 1) of the main structure of the apparatus. A link $A^2$ $B^2$ connects the set of crossed prisms with an oscillating arm $O^2$ $B^2$. A second link $C^2$ $D^2$ connects the said arm with a crank $O^3$ $D^2$ whose shaft $O^3$ is actuated by the shaft of the driving pulley by means of a set bevel gearing. These two shafts rotate at the common speed of one revolution per period.

Figure 10:
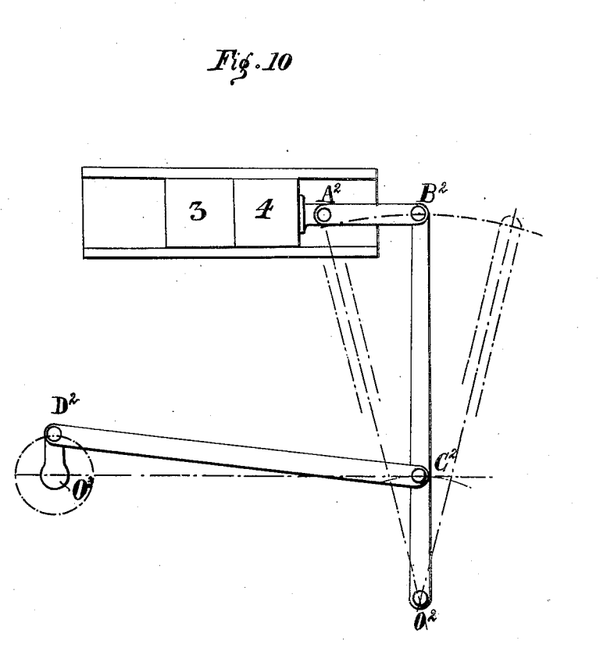
Fig. 10 is a diagrammatic detail view showing the rectilinear motion of the pair of crossed prisms.

The dimensions of the crank, the links and the arm O² B² are so determined that the alternating motion of the crossed prisms will comply with the conditions specified in section II.

(c).—*Travel of the film*

The film is drawn forward by the toothed drum 1 (Figs. 1 and 11) and the said cylinder is rotated by a set of gearing which connects its shaft with the shaft carrying the driving pulley.

Figure 11:
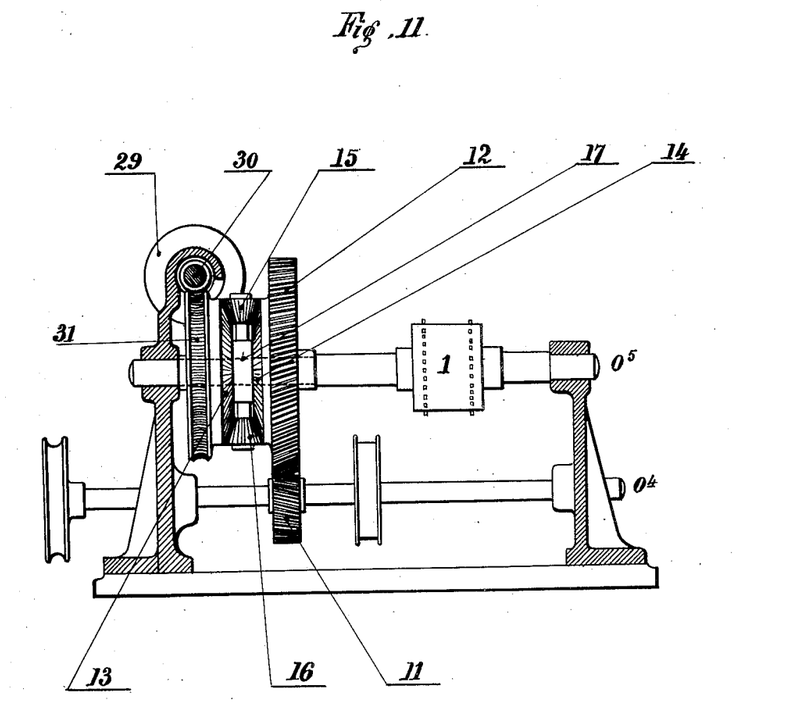
Fig. 11 is a detail view of the adjustable control for the cylinder actuating the film

Fig. 11 shows this shaft at O⁴, and the shaft of the film drum at O⁵.

Upon the shaft O⁴ is mounted the gear wheel 11 (Figs. 1 and 11) engaging the gear wheel 12 which is loose on the shaft O⁵. The gearing is completed by a differential device consisting of the bevel gears 13 and 14 and by the planetary pinions 15 and 16; the bevel gear 14 is secured to the gear wheel 12.

If the wheel 13 is supposed to be fixed, the shaft 17 of the planetary pinions which traverses the shaft O⁵, will rotate the said shaft at a speed equal to one-half the speed of the wheel 12.

The gear ratios are calculated in such manner that the film drum will rotate at a speed which is necessary in order that the film may travel at the rate of one image per period, i. e. per revolution of the axis O⁴. The utility of the said differential will be shown in paragraph (e).

(d).—*Framing of the screen image*

Referring to the optical principle specified in section II, it is observed that the aperture or window before which the film is to travel, should have a height which is somewhat more than twice the length of the smaller side of the image; so that above and below the effective image, the apparatus will project parasitic images which offer prejudice to the appearance of the projection. However, the screen is always bordered by a frame (consisting preferably of plush) which has a dark or a black colour. This frame, which is some 20 or 30 cm. in width, will absorb the parasitic images.

Nevertheless, it is necessary that these images should not extend beyond the outer rectangle of the plush frame, and for this reason the apparatus comprises a device whereby their extension is limited to a small value.

Figure 12:
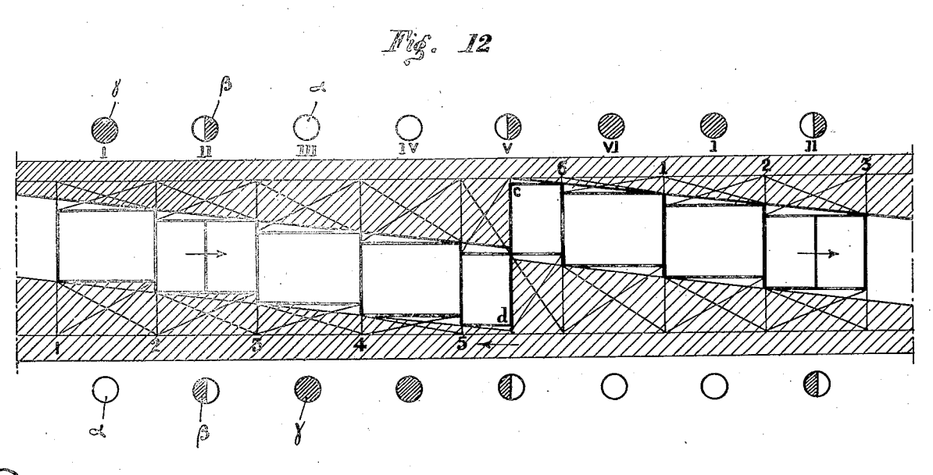
Fig. 12 is a like view showing the theoretical path of the closing device.

Fig. 12 shows the successive positions occupied at the instants corresponding to the middle of the intervals I, II, III, etc., by the views of the film employed for projecting the image received in the frame of the screen.

The rectangles I, II, III, etc., show the successive aspects of the window, viewed from the rear. In each rectangle, the part surrounded by a heavy line represents the effective image. All the parts outside the framing, in the rectangles whose diagonals are shown will represent only the parasitic images. The signs $\alpha \beta \gamma$ placed above and below the rectangles, signify that the image produced by the upper or lower objective is either complete, medium or dark. If a continuous opaque band were drawn from right to left before the window, the band having a cut-out part as shown by the outline in Fig. 12, the prejudicial images will be almost covered, and their part extending into the window will be absorbed by the plush border of the screen.

The transverse motion of the band will depend upon the action of the driving shaft, and its speed will be so regulated that in the interval V, the line $c\ d$ will have practically the same speed as the line separating the crossed prisms at the middle of the said interval.

Figure 2:
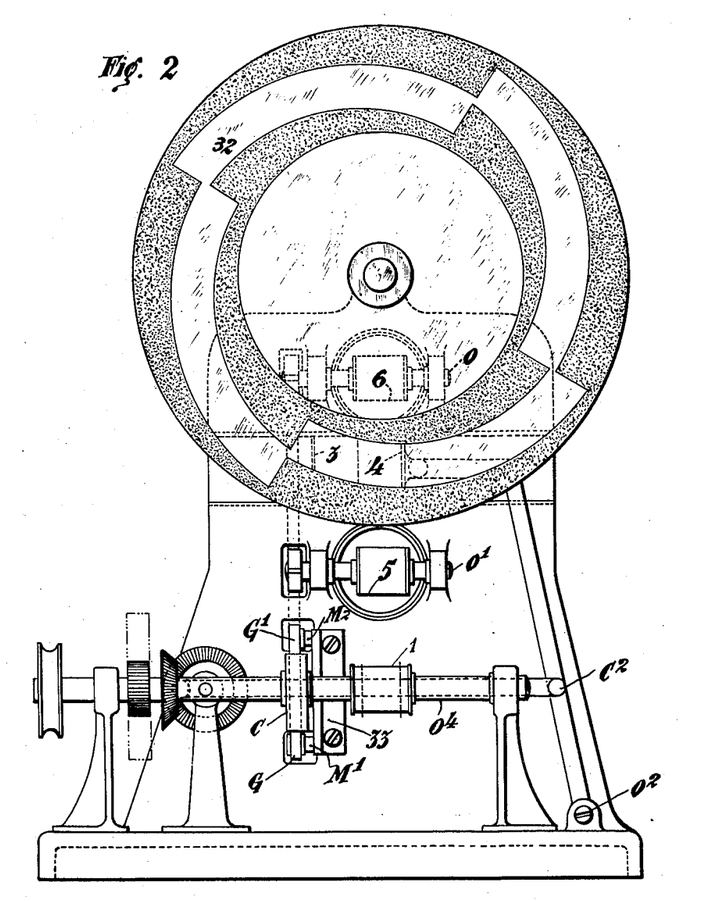

The mechanical construction representing this arrangement would offer some difficulties; but it is on the contrary an easy matter to effect the rotation of a glass disc 32 at the proper speed (Figs. 1 and 2). By covering the said disc with an opaque layer which is then partly removed according to the outline shown in Fig. 2, the desired result will be obtained.

(e).—*Adjustment*

The devices employed for adjustment are as follows:—

1.—Devices for correcting the defective mounting of the prisms and the defects in manufacture such as the inaccuracy of the dihedral angles, and for assuring at each performance the coincidence of the images produced by the two objectives.

2.—Devices for obviating the shrinkage of the film which takes place after a certain time of service.

3.—Devices for regulating the setting of the film entraining drum so that the images of the film will be properly placed with reference to the origin of each period of movement of the cam and of the distributing prisms.

1.—*Corrections for faulty erection and adjustment of the coincidence of the projected images*

Certain conditions will be admitted which can be obtained in standard manufactures, and can be verified for each part when the latter is received by the checking department. These conditions are as follows:—

The cam is properly trimmed.

The reflecting surfaces are accurately disposed.

The prisms have no play in their frames. It is further admitted that the wear of the pivot joints is properly taken up by springs adapted for the purpose, and that the dimensions of the power transmission parts such as arms, rods and links have been properly determined in order to obviate all flexion.

Lastly, it will be provisorily supposed that the pitch of the film, i. e. the distance between two adjacent views, has its theoretical value.

If these conditions are obtained, the image projected by each objective will be practically stationary when the apparatus is functioning, since the only factor in the formation of this image is a single set of two prisms which is brought during each period into the same relative positions, according to the principle of the invention. However, the images formed by the two objectives will not coincide.

As the first and principal cause of the displacement, it is necessary to refer to the spacing between the axes of the objectives, and further, displacements of less value will be caused by defects in the mounting of the prisms and by faults in the cutting of the glass, such as the inaccuracy of the dihedral angles.

The operation is performed upon apparatus already erected, but in the inoperative position, the films being replaced by a plate of glass or mica which carry indicating marks. This first adjustment need not be interfered with except when the apparatus is disposed at another distance from the projection screen.

Figure 13:
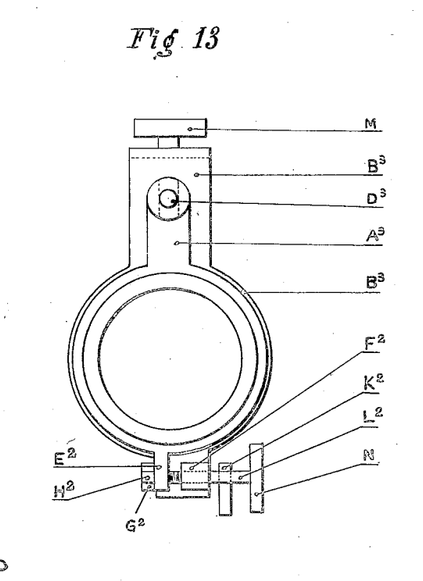
Figs. 13 and 14 are respectively front and side views of the correcting device for coincidence, which is mounted on the upper objective.
Figure 14:
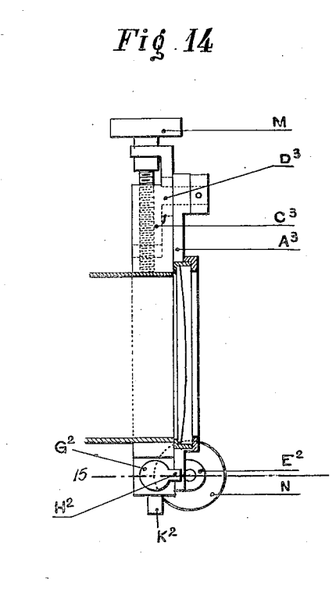
Figure 15:
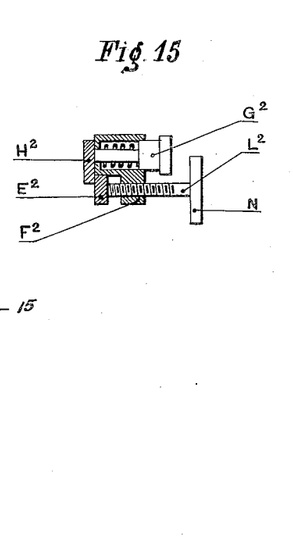
Fig. 15 is a section on the line 15—15 of Fig. 14.

The adjustment for the coincidence in the horizontal direction and the improvement in the vertical adjustment are effected, and if necessary before each performance, when the apparatus is functioning, as is done for the focusing, by displacing the diverging mechanism of the upper objective by means of the knobs M and N of the corrector for the coincidence, as shown in Fig. 13.

In this figure:—

$A^3$ represents the frame of the diverging lens.

$B^3$ represents the collar supporting the corrector.

$C^3$ represents the slide for the axle of the frame.

$D^3$ represents the axle of the frame.

$E^2$ represents the lug of the frame.

$F^2$ represents the nut for horizontal displacement.

$G^2$ represents the head for the return motion.

$H^2$ represents the projection on the head.

$K^2$ represents the push-piece for the head.

$L^2$ represents the screw for the horizontal displacement.

M represents the knob for the vertical displacement.

N represents the knob for the horizontal displacement.

The functioning of the said corrector takes place in the following manner:—

The control by the knob M will raise or lower the slide $C^3$ which slides in the upper part of the supporting collar $B^3$. The frame $A^3$ of the diverging lens is drawn forward in this movement, and due to the displacement of the optical centre of the said lens, the projection beam is raised or lowered.

The control by the knob N will displace the lug $E^2$ of the frame, and it will rotate on the axis $D^3$, thus laterally displacing the optical centre of the lens, and this will rotate the projected beam in a practically horizontal plane.

By means of the projection $H^2$, the return head $G^2$ will maintain a constant contact between the lug $E^2$ and the end of the screw for horizontal displacement $L^2$.

To remove the objective itself from the universal frame the push-piece $G^2$ is turned so as to place the projection of the head in the vertical position, thus releasing the lug of the frame $A^3$ so that the latter can be raised.

*2.—Corrector for the shrinkage of the film*

This device is adapted to modify the amount and the angular speed of the oscillating motion of the compensating prisms.

For this purpose, I modify the ratios $$\frac{A\,F}{A\,B} \text{ and } \frac{A^1\,F^1}{A^1\,B^1}$$

(Fig. 9) by varying at the same time and by the same quantity the position of the axes A and $A^1$, but without displacing the pivoting points F and $F^1$. This device is constructed for instance as shown in Fig. 1. The member 36, which has been already mentioned in paragraph (a) and which carries the two forks 38 and 39, is slidable by its inclined plane in the inclined member 42 which slides in the support 43 secured to the main frame. The member 36 is traversed—by easy friction—by a bolt 44 screwed into the main frame, and is strongly pressed against the member 42 by the spring 46.

It will be noted that by acting upon the controlling knob 47 of a nut provided with projections I may vertically displace the member 42 and hence laterally displace the member 36 and the journals A and $A^1$, i. e. the pivoting points of the two levers provided with rollers; this varies the ratio between the movements of the rollers and the movements of the ends of the oscillating arms of the mirrors or prisms 5 and 6, which is the object to be attained.

*3.—Adjustment of the film drum*

Before projecting a film, the operator proceeds to dispose the film in the apparatus, and for this purpose he inserts its end into the guide 2 (Fig. 1) then pushes it into the cylindrical channel 28, seizes the edge issuing therefrom, and draws it out by hand to a sufficient length to attach it to the lower winding reel and then places the perforations upon the teeth of the film actuating drum.

Figure 11A:
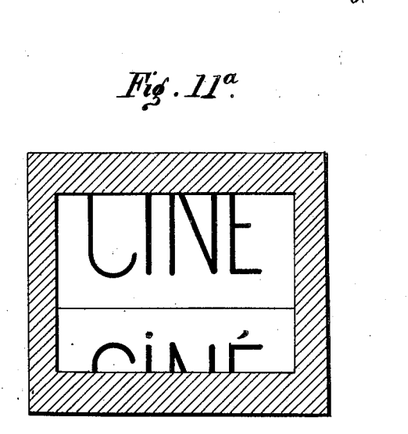
Fig. 11a is a diagrammatic view of a badly adjusted projection.

Before performing this latter operation, he must be assured that a line of separation between two images comes opposite a standard point marked at the incoming end of the film guide or gate which comprises the window, but in spite of this precaution and especially should he neglect it, it may happen that the projections of the images will be displaced with reference to the projection of the window upon the screen (Fig. 11a).

It frequently happens that a faulty connection which is made during the projection will cause a displacement of the image, and the operator must have the means to rectify the position of the images when the apparatus is functioning.

For this purpose he employs the knob 29 of the differential which is shown in Fig. 11, and through the medium of the tangent screw 30 and the wheel 31, he turns the bevel gear 13 of the differential, and thus rotates the film drum, without any action upon the cam and prism device. The amount of the correction is not limited in any direction, and this device offers, as compared to those which are in general use, the advantage consisting in the fact that they require no increase in the height of the window nor consequently in the illuminated surface.

The prisms entering into the construction of the apparatus may be replaced by mirrors.

Lastly, the apparatus may also serve for taking views.

It is obvious that the apparatus is susceptible of all necessary modifications without departing from the spirit of the invention.

What I claim is:—

1. A cinematographic projection apparatus comprising, in combination, means for moving the film in a continuous manner two crossed reflectors disposed in front of the film, two compensating reflectors adapted to reflect the images of the film given by the two crossed reflectors respectively, means for imparting to said compensating reflectors an oscillating motion whereby the virtual image of the continuously moving film is kept stationary for one direction of the oscillation, means for giving the crossed reflectors a reciprocating motion parallel to the film but perpendicular to its direction of travel, so that they reflect the light beam alternately on each of the compensating reflectors while said reflector is oscillating in the direction that gives a stationary image, and two lenses adapted to project the stationary images on a screen so that they coincide.

2. A cinematographic projection apparatus comprising, in combination, means for moving the film in a continuous manner, two crossed prisms disposed in front of the film and the edges of which are parallel to the film but perpendicular to its direction of travel, two compensating prisms adapted to reflect the images of the film given by the two crosed prisms respectively, means for imparting to said compensating prisms an oscillating motion about axes parallel to the edges of the crossed prisms, whereby the virtual image of the continuously moving film is kept stationary, for one direction of the oscillation, means for giving the crossed prisms a reciprocating motion parallel to their edges so that they reflect the light beam alternately on each of the compensating prisms while said prism is oscillating in the direction that gives a stationary image, and two lenses adapted to project the stationary images on a screen so that they coincide.

3. A cinematographic projection apparatus comprising, in combination, a driving pulley, means actuated by said driving pulley for moving the film in a continuous manner, two crossed prisms disposed in front of the film and the edges of which are parallel to the film but perpendicular to its direction of travel, two compensating prisms adapted to reflect the images of the film given by the two crossed prisms respectively, means actuated by the driving pulley for imparting to said compensating prisms an oscillating motion about axes parallel to the edges of the crossed prisms, whereby the virtual image of the continuously moving film is kept stationary for one direction of the oscillation, means actuated by the driving pulley for giving the crossed prisms a reciprocating motion parallel to their edges so that they reflect the light beam alternately on each of the compensating prisms while they are oscillating in the direction that gives a stationary image, and two lenses adapted to project the stationary images on a screen in such manner that they coincide.

4. A cinematographic projection apparatus comprising, in combination, a shaft, a driving pulley keyed on said shaft, means actuated by said driving pulley for moving the film in a continuous manner, two crossed prisms disposed in front of the film and the edges of which are parallel to the film but perpendicular to its direction of travel, two compensating prisms adapted to reflect the images of the film given by the two crossed prisms respectively, a cam on the aforesaid shaft, two rollers adapted to cooperate with said cam, a system of articulated rods connected to said rollers for imparting to said compensating prisms an oscillating motion about axes parallel to the edges of the crossed prisms, whereby the virtual image of the continuously moving film is kept stationary for one direction of the oscillation, means actuated by the driving pulley for giving the crossed prisms a reciprocating motion parallel to their edges so that they reflect the light beam alternately on each of the compensating prisms while they are oscillating in the direction that gives a stationary image, and two lenses adapted to project the stationary images on a screen in such manner that they coincide.

5. A cinematographic projection apparatus comprising, in combination, a shaft, a driving pulley keyed on said shaft, means actuated by said driving pulley for vertically moving the film in a continuous manner, two crossed prisms having their edges horizontal and parallel to the film disposed in front of the film, two compensating prisms with horizontal edges parallel to the film, located respectively over and under the crossed prisms and adapted to reflect the images of the film given by the two crossed prisms respectively, a cam on the aforesaid shaft, two rollers adapted to cooperate with said cam, a system of articulated rods connected to said rollers for imparting to said compensating prisms an oscillating motion about horizontal axes parallel to the film, whereby the virtual image of the continuously moving film is kept stationary for one direction of the oscillation, means actuated by the driving pulley for giving the crossed prisms a reciprocating motion parallel to their edges so that they reflect the light beam alternately on each of the compensating prisms while said prisms are oscillaing in the direction that gives a stationary image, and two lenses adapted to project the stationary images on a screen in such manner that they coincide.

In testimony whereof I have signed this specification.

ETIENNE SAINTE CLAIRE DEVILLE.